UNITED STATES PATENT OFFICE.

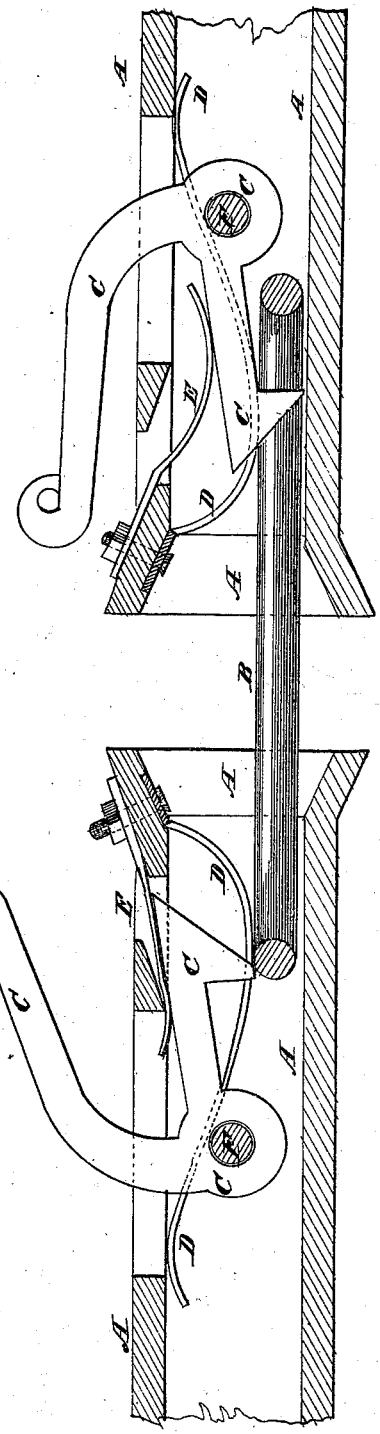

WILIE D. POPE, OF GADSDEN, ALABAMA.

IMPROVEMENT IN CAR-COUPLINGS.

Specification forming part of Letters Patent No. 143,638, dated October 14, 1873; application filed May 31, 1873.

*To all whom it may concern:*

Be it known that I, WILIE D. POPE, of Gadsden, in the county of Etowah and State of Alabama, have invented a new and useful Improvement in Automatic Car-Couplings, of which the following is a specification:

The figure is a vertical longitudinal section of my improved car-coupling.

My invention has for its object to furnish an improved car-coupling, simple in construction, convenient in use, and reliable in operation, being so constructed that it will couple itself as the cars are run together, and which may be uncoupled from the top of the cars. The invention consists in the hook and the two springs, constructed and arranged to operate, in connection with each other, the bumper-head, and the link, as hereinafter fully described.

A represents the bumper-heads, the mouths of which are made hopper-shaped, to guide the link B into place. The cavity of the bumper-heads A is made large to receive the hooks C and springs D and E. The hooks C are made in about the shape shown in the figure—that is to say, with two arms, both projecting forward. The lower arm of the hook C has a hook formed upon the lower side of its forward end, which forward end is beveled off, so that it may be raised by the end of the entering link B. The hook C is pivoted at its bend or angle to the bumper-head by a pin, F, which passes horizontally through the bumper-head, and which sustains the draft-strain. The hooks C are enlarged at their pivoting-points, which enlargements serve as stops to prevent the link B from entering the bumper-heads too far. The upper arms of the hooks C pass up through a slot in the upper side of the bumper-heads, and project forward nearly to the forward ends of the said bumper-heads, so that the weight of the said upper arms may tend to hold the lower arms down upon the link B. A cord or chain may be attached to the forward end of the upper arm of the hooks C, and carried up to the top of the car, so that the hook may be raised for uncoupling from the said top of the car, when desired. D is a spring, the forward end of which is attached to the inclined upper side of the mouth of the bumper-head A. The spring D is curved downward and upward as it passes back, and is slotted to receive the lower arm of the hook C, and allow said hook to play freely. The spring D serves as a guide to the link B when entering the bumper-head, to cause it to pass beneath the hook C. It also serves to hold the link B down, and prevent it from being raised by the hook C, when the said hook is raised in uncoupling. The forward end of the spring E is secured to the upper side of the inclined top of the mouth of the bumper-head A by the same bolt that secures the forward end of the spring D. The spring E passes down through a square hole in the forward part of the upper side of the bumper-head A, curves downward and upward, and rests upon the upper side of the lower arm of the hook C, to hold said hook down upon the link B. The spring E should be stiff enough to hold the hook from jumping up, and at the same time should be elastic enough to allow the said hook to be raised by the entering link as the cars are run together.

Having thus described my invention, I claim as new and desire to secure by Letters Patent—

The draw-head A, springs D E, and hook C C C, combined, constructed, and relatively arranged as and for the purpose described.

WILIE D. POPE.

Witnesses:
    JOS. F. MCGHEE,
    J. P. MCDUFFIE.